United States Patent [19]

Quaglia

[11] Patent Number: 5,312,116
[45] Date of Patent: May 17, 1994

[54] SELF-ADJUSTING O-RING SEAL PRODUCT TO RETAIN INTERNAL BEARING LUBRICANTS AND PNEUMATIC PRESSURES

[75] Inventor: Lawrence D. Quaglia, 917 Quincy Ave., Bronx, N.Y. 10465

[73] Assignee: Lawrence D. Quaglia, Bronx, N.Y.

[21] Appl. No.: 719,035

[22] Filed: Jun. 21, 1991

[51] Int. Cl.⁵ ............................................. F16J 15/32
[52] U.S. Cl. .................................. 277/27; 277/26; 277/34; 277/70; 277/205; 277/220; 384/152
[58] Field of Search ............... 277/26, 27, 34, 34.3, 277/70, 76, 205, 206 R, 71, 79, 220, 221, 165; 384/152, 322, 475, 489

[56] References Cited

U.S. PATENT DOCUMENTS

| | | | |
|---|---|---|---|
| 2,109,680 | 3/1938 | Neveling, Sr. | 384/153 |
| 2,365,046 | 12/1944 | Bottomley | 277/136 |
| 2,388,925 | 11/1945 | Messinger | 277/206 |
| 2,686,402 | 8/1954 | Samuel | 277/205 |
| 2,729,478 | 1/1956 | Chamber, Jr. et al. | 277/206 |
| 2,822,192 | 2/1958 | Beatty | 277/34.3 |
| 3,330,563 | 7/1967 | De Puydt et al. | 384/153 |
| 3,508,736 | 4/1970 | Rhodes | 277/205 |
| 3,746,415 | 7/1973 | Thomson | 384/153 |
| 3,829,106 | 8/1974 | Wheelock | 384/152 |
| 3,921,991 | 11/1975 | Beck | 277/205 |
| 4,077,389 | 3/1978 | Vogel | 277/26 |
| 4,155,557 | 5/1979 | Grebert | 277/27 |
| 4,268,331 | 5/1981 | Stevens | 277/26 |
| 4,284,280 | 8/1981 | Bertram | 277/27 |
| 4,508,355 | 4/1985 | Ditcher | 277/34.3 |
| 4,577,870 | 3/1986 | Scott et al. | 277/27 |
| 4,718,820 | 1/1988 | Jaques | 277/27 |
| 4,764,035 | 8/1988 | Boyd | 384/152 |
| 4,768,889 | 9/1988 | Loser et al. | 384/152 |
| 4,890,849 | 1/1990 | Eason | 277/27 |
| 4,988,218 | 1/1991 | Quaglia | 384/475 |

FOREIGN PATENT DOCUMENTS

| | | | |
|---|---|---|---|
| 0907614 | 3/1954 | Fed. Rep. of Germany | 277/34.3 |
| 0086960 | 1/1980 | Japan | 277/205 |
| 0566214 | 12/1944 | United Kingdom | 277/29 |

Primary Examiner—William A. Cuchlinski, Jr.
Assistant Examiner—Daniel G. DePumpo

[57] ABSTRACT

The present invention provides an O-Ring mounted in a square shaped chamber in a housing. The O-Ring contains a groove adapted to move the O-Ring inner bore toward the center of the shaft in response to a pressurized fluid. The chamber is fed by a liquid or a gas. Internal pressure in the housing created primarily by rotation of the shaft, or by a pump from an outside source, feeds fluid to the chamber through openings in the housing, thereby expanding the O-Ring to lightly contact the shaft. This is a major benefit over conventional O-Rings, seals and prior art that enables the O-Ring to provide minimum drag and maximum sealing of internal lubricants for bearing operation. Another major benefit of this self-adjusting O-Ring is that it automatically compensates for wear, increasing its service life to many times that of conventional O-Rings.

21 Claims, 10 Drawing Sheets

SELF-ADJUSTING O-RING SEAL PRODUCT TO RETAIN INTERNAL BEARING LUBRICANTS AND PNEUMATIC PRESSURES

FIELD OF THE INVENTION

The present invention is directed to an O-Ring for an internally or externally created pressure and more particularly to a fluid controlled pressure responsive O-Ring.

BACKGROUND OF THE INVENTION

O-Rings having elastic qualities have been known for many years as seals for bearings. Examples of such rings are those disclosed in U.S. Pat. No. 4,764,035 to Boyd, dated Aug. 16, 1988, U.S. Pat. No. 3,746,415 to Thompson, dated Jul. 17, 1973; U.S. Pat. No. 3,330,563 to De Puydt et al., dated Jul. 11, 1967; and U.S. Pat. No. 2,109,680 to Neveling, Sr., dated Mar. 1, 1938.

U.S. Pat. No. 3,829,106 to Wheelock, dated Aug. 13, 1974, discloses an elastomeric ring with a pressure sensitive lip seal 14.

A problem with the prior art is that their seals are limited in performance and do not allow for misalignment of shafts. Also when the surface of these rings wear, from contact with the shaft, sealing pressure is lost. The seal is no longer maintained and the O-Ring must be replaced.

SUMMARY OF THE INVENTION

It is an object of the present invention to overcome this problem by providing an O-Ring which, after extended use, continues to maintain contact with the shaft and to maintain sealing pressure.

The present invention provides a simple, long lasting, pressure-responsive O-Ring for use in connection with a bearing system wherein the O-Ring provides a pressure seal with a shaft or bearing inner race. The O-Ring has an internal chamber. The chamber can be sealed or access to the chamber can be provided by a channel. The O-Ring is mounted in a hub or housing having a parallel-sided recess with relatively sharp corners. An inner cavity is defined by the space within the housing between the O-Ring and the shaft. An outer cavity is defined by the space within the housing between the O-Ring and the housing recess outer wall or major diameter. The outer cavity and inner cavity can be fed by a fluid to create internal pressures. The surface area can be designed to provide controlled opposing pressure forces. The pressure is created either by shaft rotation, temperature responsive material or, by a pump that pushes fluid into the cavities through openings in the housing. The O-Ring expands to lightly contact the shaft creating a pressure seal. This enables the O-Ring to provide minimum drag and maximum sealing of fluids such as lubricants used for bearing operation. As pressure in the housing increases, the pressure further expands the O-Ring and increases sealing contact with the shaft.

The O-Ring of the present invention continues to expand under increasing fluid pressure being pressure responsive to adjust and maintain a seal after extended use and under changing use conditions. The O-Ring of the present invention saves fluid such as lubricant and can be adapted for use at higher pressures than those in which standard O-Rings are used. The present invention can form a lubrication seal in pressurized systems and can be used at very low temperatures.

DETAILED DESCRIPTION OF THE PREFERRED EMBODIMENTS

Figure 1:
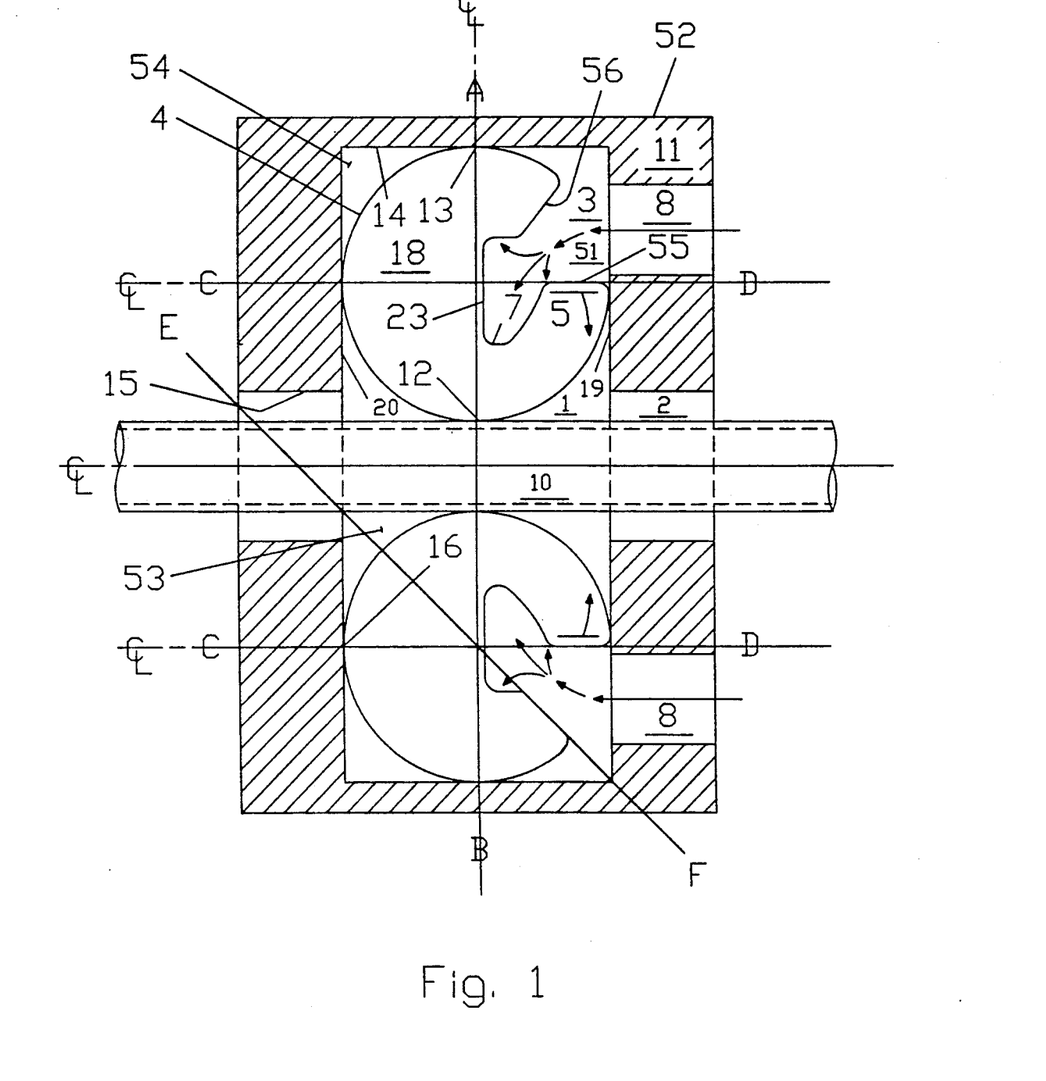
FIG. 1 is a sectional view illustrating a first embodiment of the O-Ring of the present invention mounted in a housing.
Figure 2:
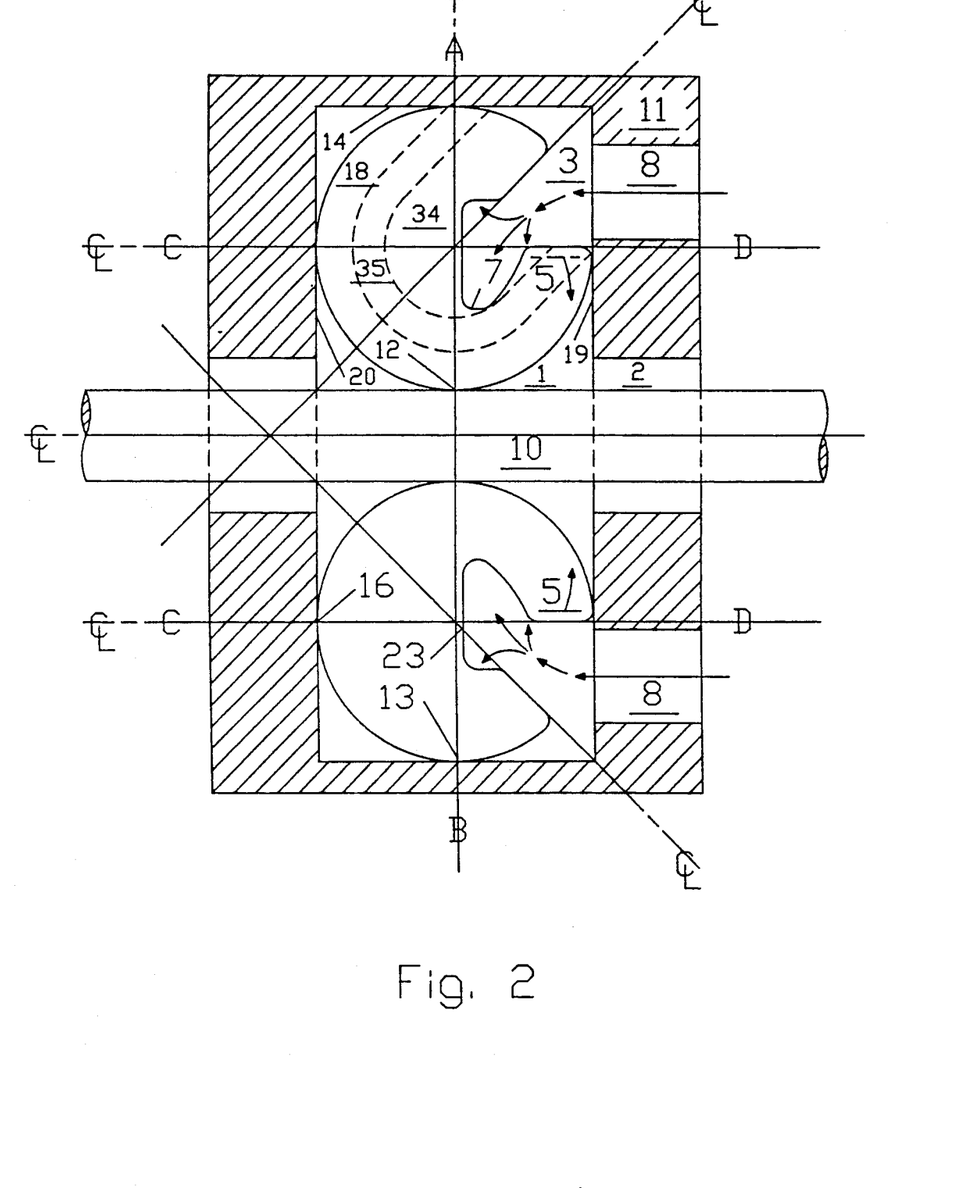
FIGS. 2-4 are sectional views of a connectable O-Ring which functions in the same way as the O-Ring of FIG. 1.

Referring now to FIG. 1, an O-Ring 18 is provided that is essentially a solid elastomer with a circular central opening forming an inner extremity and minor diameter 12 to receive a shaft 10. The O-Ring has an inner chamber 7 and a channel 51 leading to the chamber. The O-Ring fits within a housing 11. The housing 11 has an inner extremity and minor diameter 15, that receives the shaft 10, and a recess 53 for the O-Ring 18. The O-Ring operates as follows: pressure fluid enters through three openings 8 spaced 120° apart in the housing 11 and into outer cavity 3, channel 51 and circular enlarged chamber 7 in the O-Ring. As shown in FIGS. 1 and 2, the outer volume includes cavity 3, the enlarged circular chamber 7 and channel 51 leading from cavity 3 into the chamber. The enlarged chamber includes an inner chamber wall 23 that extends essentially along a first axis AB and extends essentially equal distances above and below a second axis CD essentially through the cross section of the O-Ring major width 16. The channel is formed by an inner channel wall 55 that extends essentially along the second axis CD and an outer channel wall 56 that extends along a line EF that is essentially 45° with the shaft 10 center line and passes through the intersection of the first axis AB and second axis CD and extends into the outer cavity 3. Pressure causes the less supported flexible section 5, formed by the enlarged chamber and channel of the O-Ring, to tend to pivot about minor diameter 12 and to deform inwardly some in housing 11. This movement of flexible section 5 brings additional contact between of O-Ring inner extremity surface in the minor diameter 12 area, against the surface of shaft 10, causing inner cavity 1 to become slightly smaller. Shaft 10 can be solid or hollow. In this embodiment shaft 10 does not contain a lubrication hole. O-Ring outer extremity or major diameter 13 touches housing recess outer wall or major diameter 14. This is necessary so that the incoming fluid does not pass the O-Ring outer diameter 13 and cause pressure in the outer cavity adjacent the outer cavity 3.

The fluid in outer cavity 3, channel 51 and chamber 7, exerts a pressure that causes the O-Ring to expand and press against the shaft. The expansion is opposed in part by fluid pressure in an inner cavity 1. An opening to the inner cavity in the form of a clearance space 2 between the shaft 10 and housing inner extremity, conducts pressure fluid into the inner cavity. The fluid force exerted by the pressure fluid in the cavities is essentially determined by multiplying the fluid pressure by the area over which the pressure is exerted. In the instant case the pressures in cavities 1 and 3 are essentially equal. The radial forces are thus directly related to the radial areas involved. The radial areas exposed in the chambers can be estimated by use of the standard cylindrical area equation, area equals the circumference times height. As can be seen in FIG. 1, the length of contact in cavity 1 is that between the point of contact of O-Ring 18 and shaft 10 and the recess open wall 19. The length of contact in cavity 3 is that between inner chamber wall 23 and recess open wall 19. The length of inner cavity 1 along shaft 10, exposed to fluid pressure, is less than that of the O-Ring outer cavity 3. The average diameter of the O-Ring radial surface area in inner cavity 1 is considerably less than that of the average radial diameter of the surface area of O-Ring in cavity 3, i.e. the average diameter of enlarged chamber 7 and channel inner wall 55. This is due to the position and configuration of the enlarged circular chamber 7 and channel 51 and the curvature of the O-Ring forming inner cavity 1. As a result of these differences the radial surface area of outer cavity 3 is greater than that of inner cavity 1, and the press or force exerted inwardly by the fluid in cavity 3 is greater than that exerted outwardly by the fluid in cavity 1. While it is not necessary for operation of the O-Ring, it is preferred that the O-Ring be designed so that the ratio between the force exerted inwardly and that exerted outwardly be at least 2:1. As can be seen in FIG. 1, the shape, size and position of chamber 7 determines the surface area exposed to the pressure fluid and the thickness of the flexible section 5.

It is also possible to provide an external pressure source much higher than system pressure, e.g., by specially designed hydraulic motors, etc. Additional pressure results in increased O-Ring contact with shaft 10 providing greater sealing as pressure increases.

The present invention can take advantage of the pressure created by rotation of the shaft and churning of the lubricant within the bearing. By having O-Ring 18 constructed as shown with inner chamber wall 23 extending beyond O-Ring cross-sectional axis AB, a reference can be obtained and used to provide uniformity of manufacture and operation. The inner chamber wall 23 and axis AB essentially divide the O-Ring 18 into a section 5 on one side and a rigid section 4 on the other. With inner chamber wall 23 positioned close to or on the right of the first axis AB as seen in FIG. 1, the circular O-Ring major diameter 14 can be large enough to seal yet small enough to reduce binding friction of the O-Ring at the minor diameter area 12 point of contact with the shaft. Because a pressure increase causes more movement of the O-Ring pressure sensitive flexible section 5 than that of the solid or rigid portion 4 of the O-Ring to the left of the inner groove wall 23, it is not necessary to provide a large interference fit between the O-Ring outer extremity or major diameter 13 and the housing 11 recess major diameter 14. This results in relatively low or an almost frictionless interaction between the shaft 10 and O-Ring 18. No sealing will be lost by this due to pressure responsive flexible section 5 providing additional surface contact with shaft 10 as pressure increases. As O-Ring material wears from its inner surface, continued pressure on flexible section 5 will maintain the seal despite wear of the O-Ring. This invention can be used with shafts moving in a reciprocating manner (linear movement of the shaft along its axis). The material for the O-Rings in this invention can be made of a self lubricating material so that in pneumatic applications, where there is no liquid used as a lubricant, the O-Rings will not burn from the friction caused by rotation or reciprocation.

There is a clearance 2 between the housing 11 inner extremity 15 and shaft 10. In a typical use, a housing 11 will be mounted on either side of a bearing within an outerhousing. A shaft 10 passes through each housing 11, and lubricant for the system flows into the housing 11 from within the outer housing.

The O-Ring housing is typically formed by machining from metal stock or by metal casting. However, housing 11 may be composed of any suitable material, including sheet metal. Openings 8 are preferably aligned with the O-Ring's channel 51. The housing recess opening side wall 19 and closed side wall 20 are at right angles to recess outer wall or major diameter 14.

The O-Rings of the present invention are intended to fall within the typical range of O-Ring hardness measurements of from 50 to 100 durometer rating on the Shore A scale (for rubber products).

Openings 8 in housing 11 allow entry of fluid, under pressure, into the outer cavity 3 and clearance 2 between the housing 11 and shaft 2, allow the fluid into cavity 1. Typically, fluid will enter openings from a pressurized bearing system. The bearing system may contain a pressure relief fitting to maintain the system within a desired pressure range.

Figure 3:
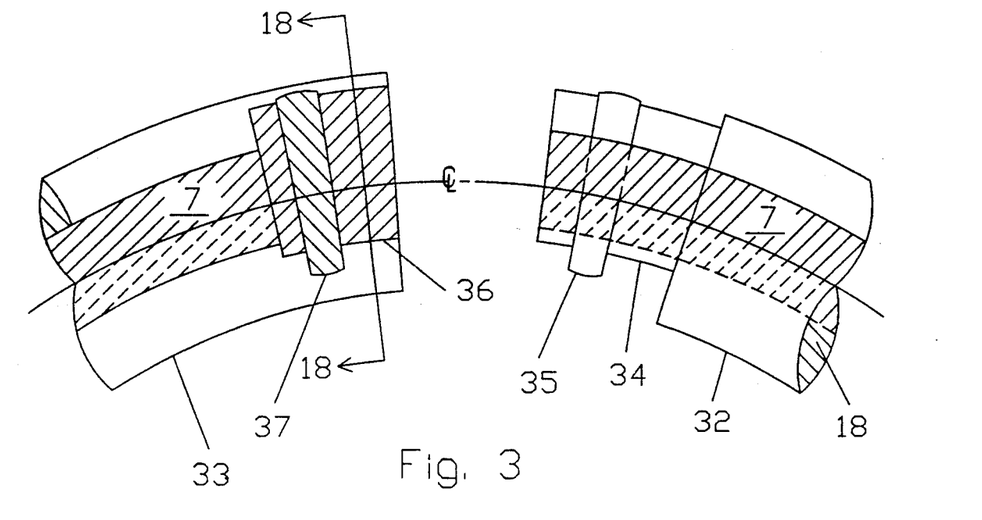
Figure 4:
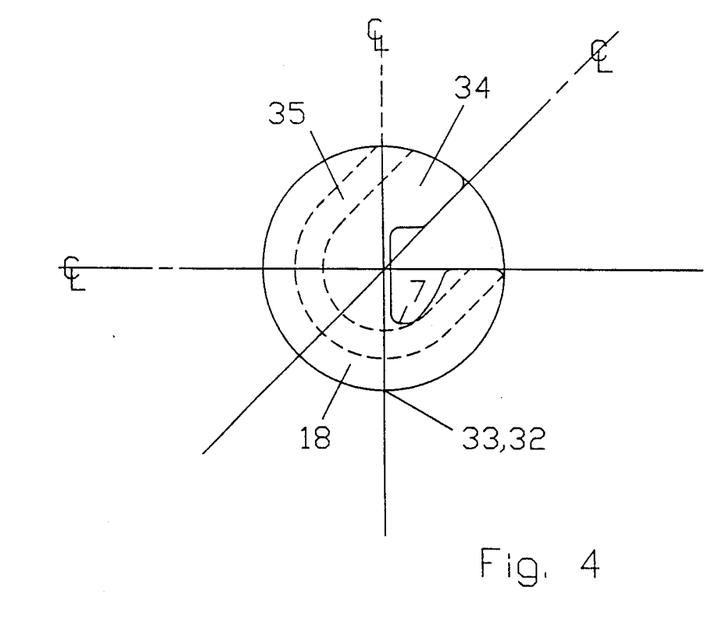

In FIGS. 2, 3 and 4 an alternate embodiment using a connectable O-Ring is shown. FIG. 2 is identical to FIG. 1 in structure and function except for adaptations in the design of the O-Ring to provide it with separable ends. The separable ends, best seen in FIGS. 3 and 4, are designed with a male end 32 and a female receiving end 33. Male end 32 includes a reduced diameter neck 34 having a lip portion 35 extending outwardly therefrom. Female end 33 has corresponding receiving portions including a hollow area 36 and a slot 37 for receiving neck 34 and lip portion 35, respectively. The O-Ring ends can be joined with a sideways movement by inserting the lip 35 into the slot 37.

FIG. 4 is a sectional view of connectable or separable O-Ring 18 at the point of connection between the male and female ends. With this configuration, the chamber 7 extends uninterrupted along the entire length of O-Ring 18. The top portion of FIG. 2 also includes a sectional view of O-Ring 18 at the point of connection of the male and female ends.

Although not shown in the drawings, the housing 11 can be supplied in two halves separated midway between the outer wall or major diameter 14 or midway within the housing minor diameter at shaft clearance area 2. These housing halves are for use with the connectable O-Rings 18, as shown in FIGS. 3 and 4, on shafts where access for assembly and disassembly is complex or difficult.

Figure 5:
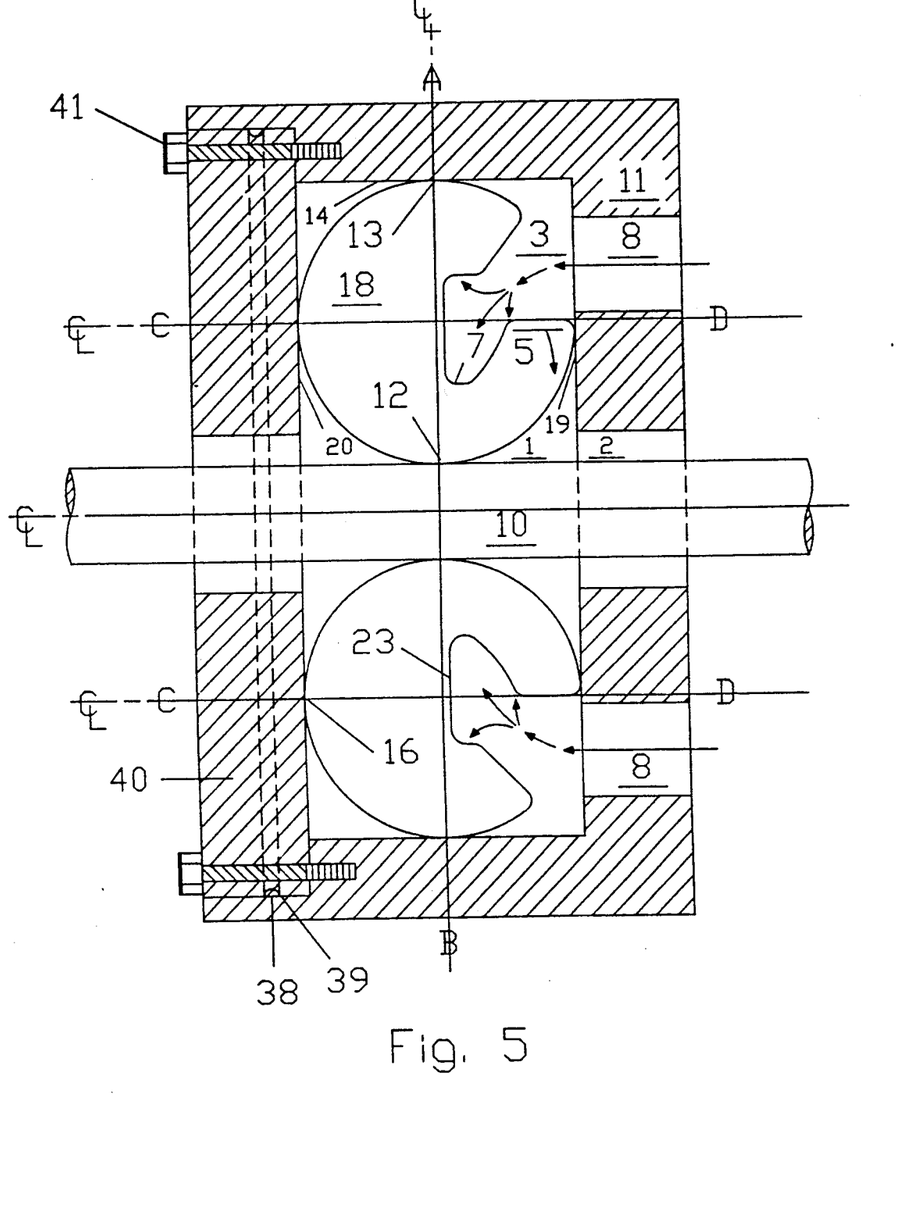
FIG. 5 is a sectional view of a further embodiment wherein the housing includes a removable side plate.

FIG. 5 is a sectional view illustrating a further embodiment of the present invention wherein housing 11 includes a removable side plate 40. Side plate 40 is usually shaped like a washer and may be secured by any suitable removable fastening means, bolts 41 are illustrated securing side plate 40 to housing 11. Additional sealing for this system is provided by a seal 38 which is set into a seal groove 39. The remaining elements of FIG. 5 are identical to those in FIG. 1.

Figure 6:
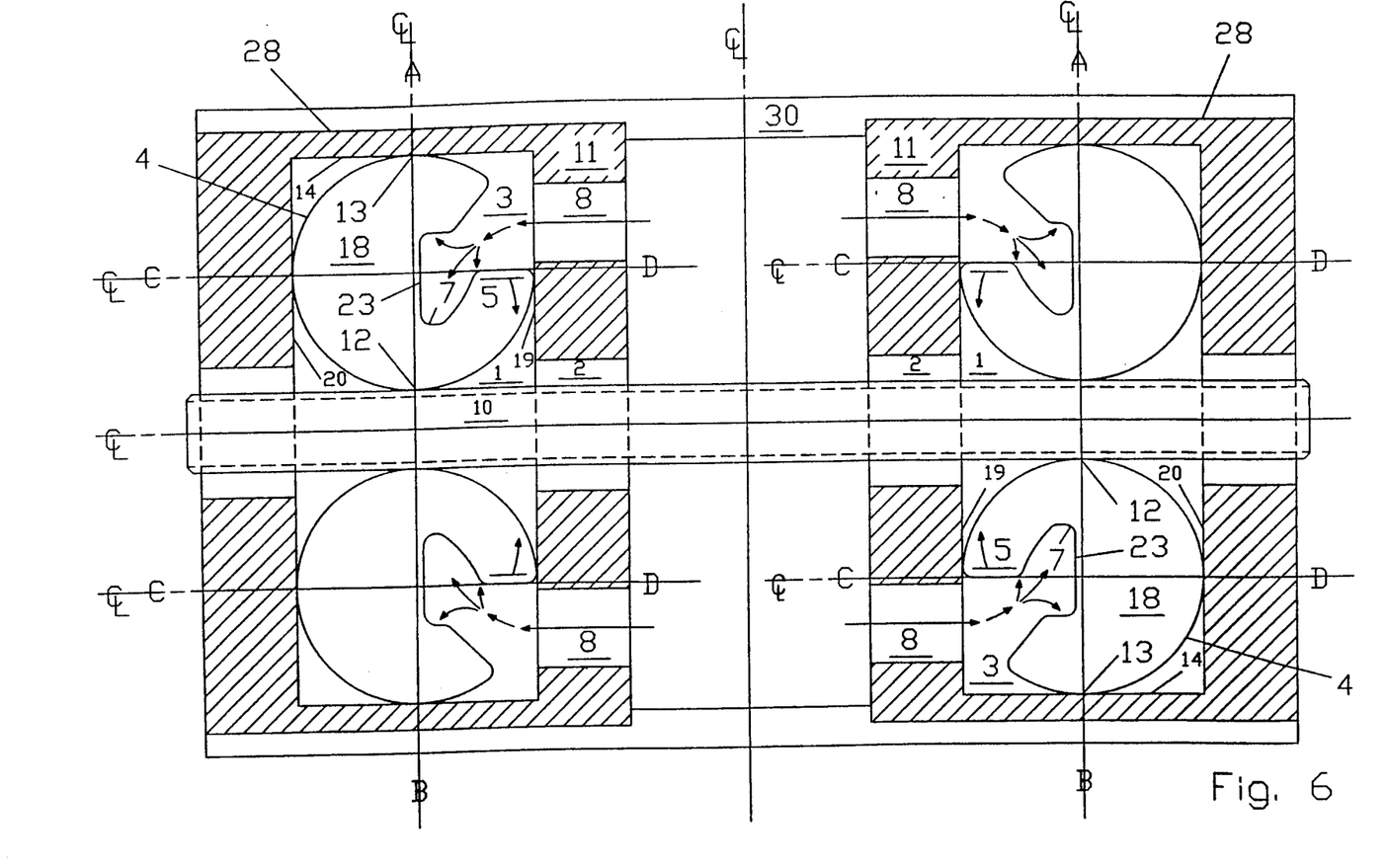
FIG. 6 is a sectional view of a further embodiment of the present invention adapted for application on either side of needle, roller or ball bearings.

FIG. 6 is a sectional view of a further embodiment of the present invention wherein shaft 10 is hollow and is adapted to be used as the inner race of a bearing. Two housings 11 are illustrated. Housings 11 act as end seals for a bearing positioned between them. A bearing case 30 is located between the housings 11 and contains needle, roller, or ball bearings. Bearing case outer race extensions contain counterbores 28 that support housings 11. Typically, shaft 10 of FIG. 6 will extend through bearing case 30 and through the housings 11. Housings 11 can be made of pressed or molded metal forming a thin wall on each side of the O-Ring. For a ball bearing application, shaft 10 can be provided with a concave groove, around the shaft circumference. Typically such a concave groove will be located in an interior section of the shaft.

When the two housings are used for one bearing embodiment, the housings including the O-Ring chamber can be packed with lubricant. The packed chamber and outer cavity 3, as well as the packed bearing, are pressed into the case outer extension counterbores 28 on each side of bearing to act as sealing units for the bearing system. This is for bearings that have no lubrication hole in the outer or inner race. When the housings are assembled with shaft 10 installed, the unit is complete. The bearing assembly in some applications has a lubrication hole in the outer or inner race. For these applications the seal and/or housing can be pressurized and capped off with suitable fittings to obtain and maintain a predetermined pressure during operation. In these assemblies, as a result of rotation, pressure builds up in the system and the O-Ring adjusts to increase the seal area around shaft 10.

Figure 7:
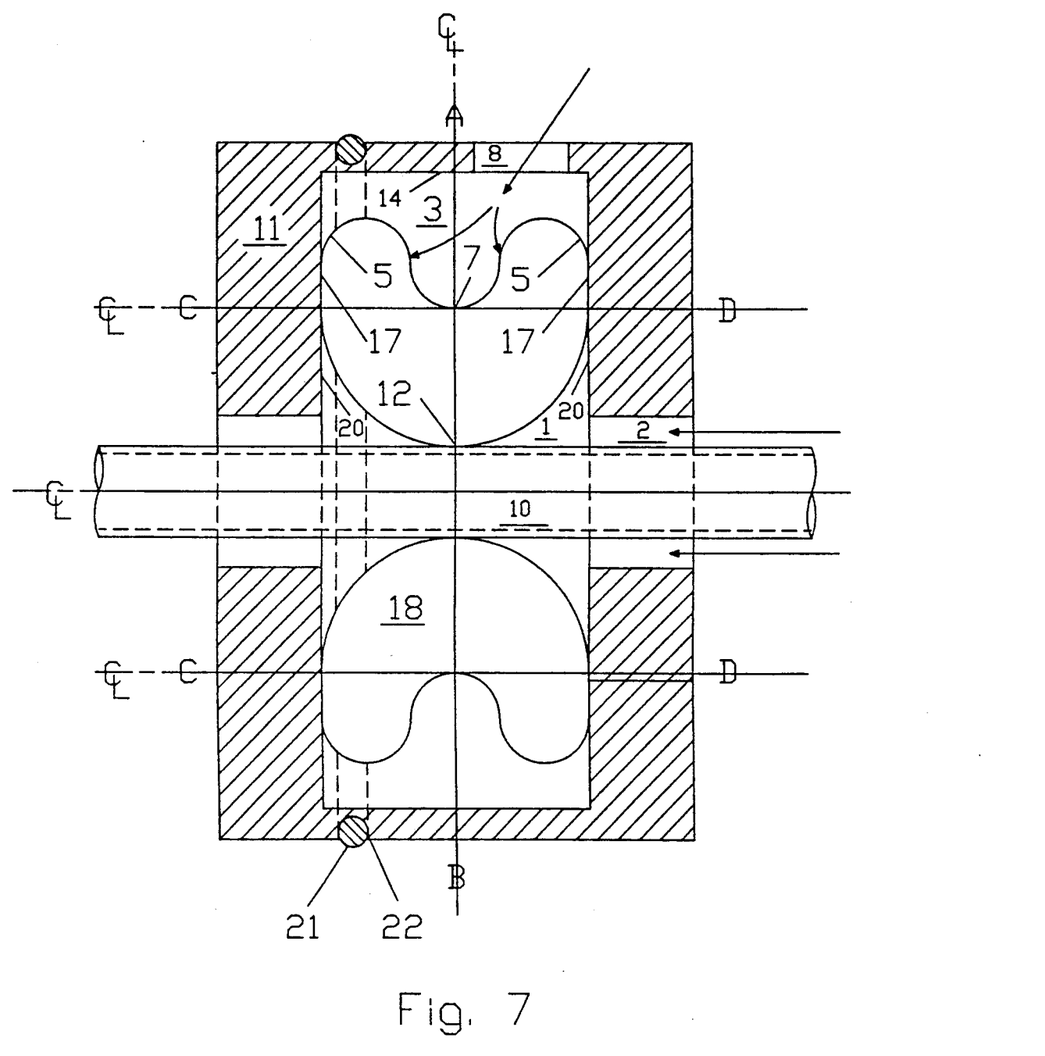
FIG. 7 is a sectional view of a further embodiment adapted for high speed applications employing an O-Ring with u-shaped groove.

Referring now to FIG. 7, this O-Ring system operates with fluid pressure with the housing under pressure. The O-Ring 48 has a relatively rigid section 58 and radial flexible sections 57 essentially separated by axis CD. The housing pressure may be generated by an external pump or by shaft rotation. The pressurized gas, for example, enters the housing enclosed space 43 through opening 8, then applies pressure to and tends to spread O-Ring radial flexible sections 57. The surfaces of O-Ring major width sides 17 wipe along housing recess side walls 27. Sides 27 are parallel to each other and are at right angles to outer wall or recess major diameter 29. The O-Ring major width sides 17, when not under pressure, fit snugly within and lightly press against recess side walls 27. The O-Ring 48 has a minimum contact with shaft 10. The system of FIG. 7 is also adapted for applications in which shaft 10 reciprocates. When a gas is used, the gas generated exerts and evenly distributes pressure in depression 49, this provides an even seal around shaft 10. The gas also provides a cushion to dampen vibration or run out that may occur from shaft 10.

The system of FIG. 7 is designed for super high speed applications with elevated temperatures such as high speed turbines, missiles, etc. There is excellent sealing that prevents lubricant from escaping from the housing.

The benefit of almost frictionless shaft and O-Ring interaction comes from the structural design of the elements disclosed. The O-Ring 48 can be a teflon base composition product called "FLUROLOY B" that is known in the art for its self-lubricating capacity and its ability to conduct heat. "FLUROLOY B" is sold by the Furon Company of Anaheim, Calif. The O-Ring may also be made from other teflon base compositions or any other suitable temperature resistent materials such as carbon filament mixed in a urethane base.

Typically, housing 11 will be assembled on each end of a bearing casing for optimum performance. Radial flexible sections 57 expand to a maximum when contacting sides walls 27 without binding therewith. Pressurized fluid presses radial flexible sections 57 against side walls 27 providing sealing contact therewith. As with the cavity of FIG. 1, pressure fluid in cavity 1 of FIG. 9 causes an outward force in opposition to the inward force created in enclosed space 43. Because of the greater inward force from enclosed space 43, the O-Ring 48 contacts the shaft 10 and aligns with it and forms a seal with it. If shaft 10 runs slightly eccentrically, O-Ring 48 is capable of adjusting to it. Again, there is compensation for wear and alignment of the O-Ring 48 with the shaft by the pressure pushing it inward to contact the shaft or bearing inner race 10.

O-Ring 48 does not normally contact O-Ring outer wall 29 in FIG. 7, but for certain applications it can. Opening 8 can be located in the housing outer extremity 52 or it can be offset as shown in FIG. 7. Seal 21 is an outer housing seal ring that fits in groove 22 and between housing 11 and an out bearing case (not shown). Cavity 1 is located between O-Ring 48 and shaft or bearing inner race 10. Clearance 2 is located between the inner extremity 15 of housing 11 and shaft or bearing inner race 10. As can be seen in FIGS. 7 and 9, for example, a first axis AB extends perpendicular to the shaft 10 center line or housing major diameter and essentially bisects the O-Ring and passes through the O-Ring minor diameter 12. A second axis CD passes through the O-Ring cross section major width 17. Cross sectional axes AB and CD are at right angles to each other. Shaft or bearing inner race 10 is shown hollow in FIGS. 7–9. Housing 11 can be stationery or rotating depending on the application. The fluid pressures on the O-Ring 48 are calculated as those of the other embodiments. This embodiment is good for high speed and high temperature applications.

In the embodiment of FIG. 7, a temperature sensitive material, such as an expandable gas, can be inserted into enclosed space 43 through opening 8. Opening 8 can then be closed or capped off so that the system operates as a sealed enclosure.

Figure 8:
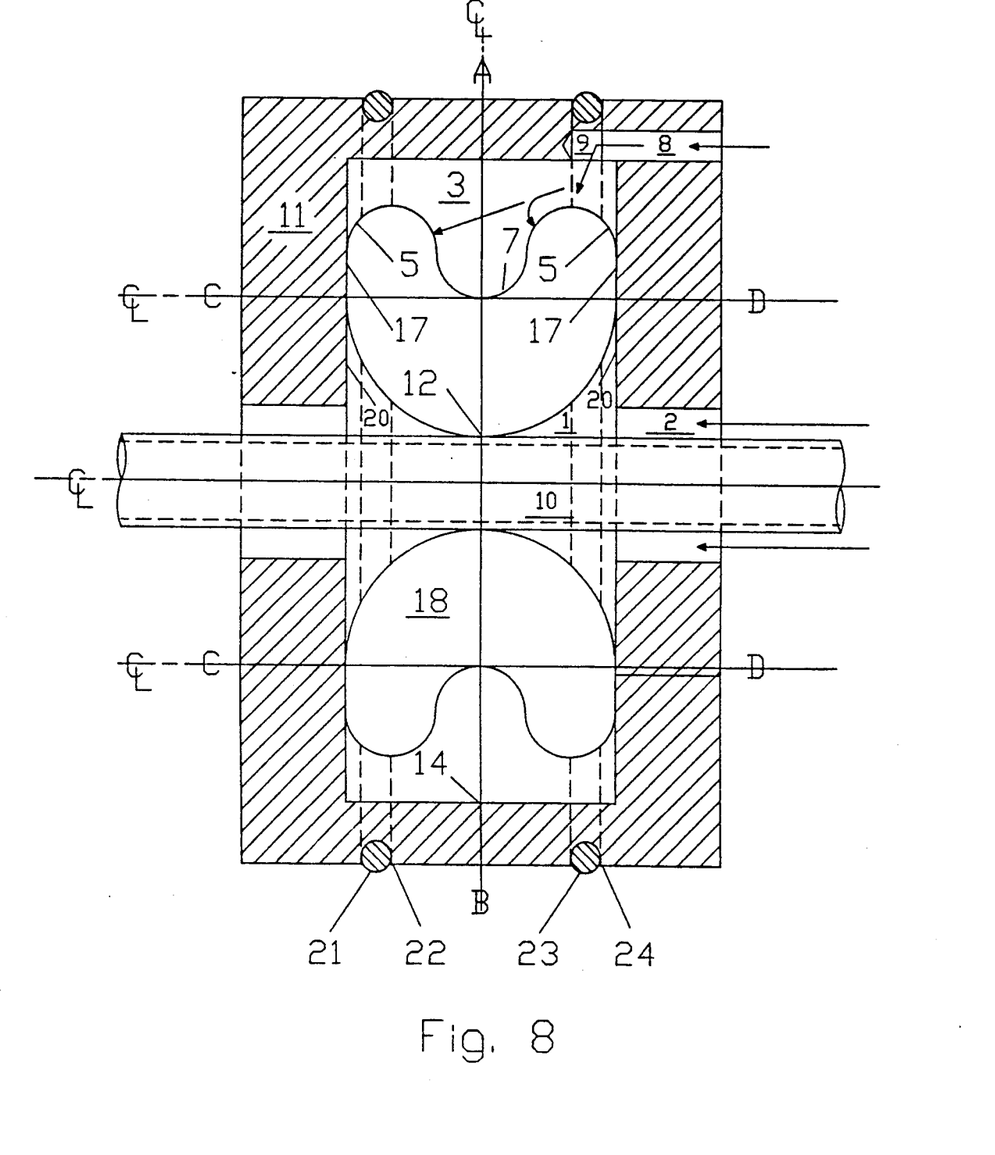
FIG. 8 is a sectional view of a modification of the embodiment of FIG. 7.
Figure 9:
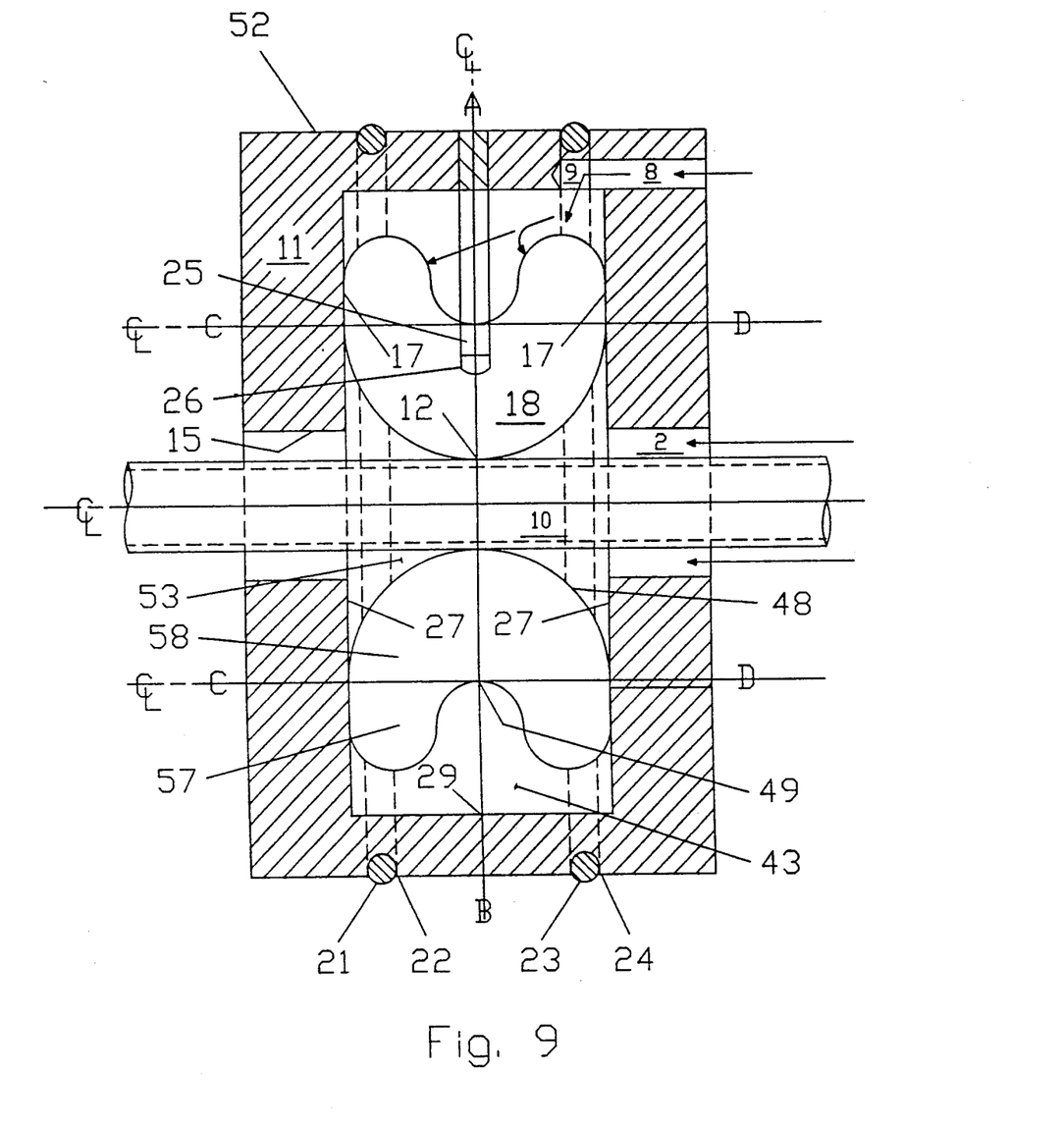
FIG. 9 is a sectional view of a further modification of FIG. 8 having a pin for securing the O-Ring against rotation.

FIG. 8 is substantially identical to FIG. 7 except that opening 8 is located in a side of housing 11 and includes a passage 9 leading into enclosed space 43. A side feed opening 8 adapts the embodiment of FIG. 8 to receive pressurized fluid generated internally from within the bearing, rather than from an external pump. Once again seal 21 is shown. An additional seal 31 riding in groove 24 is shown for additional sealing between housing 11 and an-outer bearing case (not shown).

FIG. 9 is a modification of FIG. 8 showing pin 25 in the housing that fits into hole 26 in O-Ring 48. The pin is used to stop any rotation of O-Ring 48 which might occur from run out, in high vibration loads, or due to any adhering between shaft 10 and O-Ring 48, or from eccentric rotation of shaft or bearing inner race 10. Hole 26 is deep enough so that pin 25 does not touch the bottom. Pin 25 may also be tapered with respect to hole 26 in order to maintain clearance in hole 26. Pin 25 can also have a head on its outer portion and be located below the outside diameter of body 11 in a counterbore. O-Ring 48 is preferably made with teflon product FLUROLOY B material adapted to meet operating requirements e.g., surface speed of shaft, temperature, acid resistance, etc. O-Ring 48 may also be composed of carbon filament in a urethane base, again to meet operating specifications. Seal 31 in groove 24 is used to cover passage 9. Seal 21 in groove 22 is again used as a seal between housing 11 and an outer bearing casing.

Figure 10:
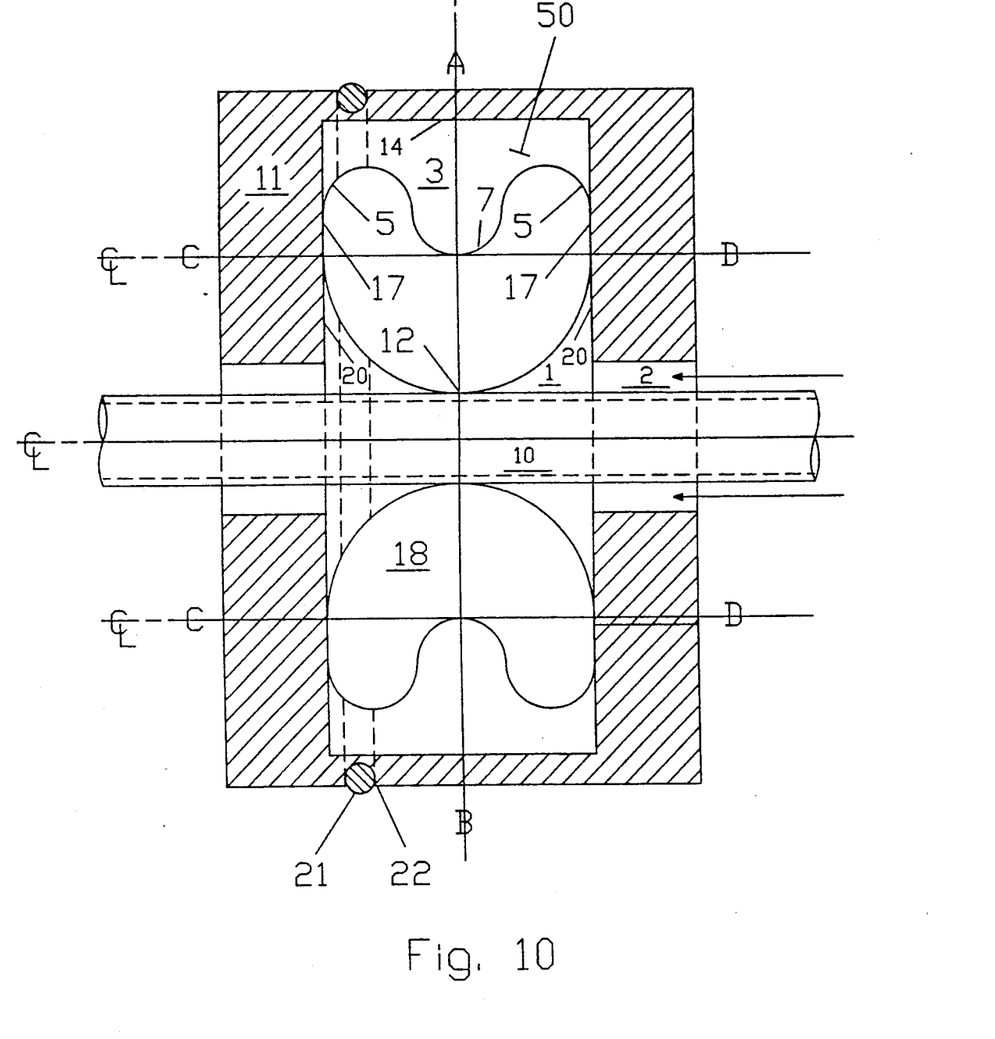
FIG. 10 is a sectional view of a further embodiment adapted for use with an expandable compound.

FIG. 10 is a sectional view of a still further embodiment of the present invention which is structurally similar to the embodiment of FIG. 7 but does not include an opening 8. In FIG. 10 enclosed space 43 is packed with a temperature sensitive material or compound 50 which expands when heated. During normal use of the present invention, heat is developed through friction created by rotation of shaft 10 in O-Ring 48 along with internal heat of the bearing assembly. Heat is transferred to compound 50 causing it to expand and to apply pressure to O-Ring 48. Due to the depression 49 in O-Ring 48, pressure is exerted on the O-Ring pressing O-Ring radial flexible sections 57 onto housing recess side walls 27 at points 17 and into contact with shaft 10 at point 12 in the same manner as in FIG. 7. The adhesive and cohesive shear of compound 50 aids in preventing O-Ring 48 from rotating.

Expandable temperature sensitive material composition 50 may be any suitable composition which expands when heated. Only moderate expansion is necessary to maintain sealing pressure on the shaft. Suitable expandable compounds are known in the art. One compound that can be used contains the elements of a flame retardant paint which can be manufactured without the addition of the usual hardener. This compound remains viscous and plastic during use and, when heated, gives off a gas which expands within enclosed space 43. A suitable paint (with hardener added) has been sold by Art-Tex Paint Co. in Brooklyn, N.Y. Other suitable compounds are commercially available.

The loading of compound 50 into enclosed space 43 is accomplished through an opening in housing 11 which is covered by seal 21. Alternately, an opening such as opening 8 in FIG. 7 may be provided, then closed during operation. It is preferable to cool compound 50 prior to packing it to provide appropriate consistency (such as a paste), to facilitate filling enclosed space 43 completely.

Figure 11:
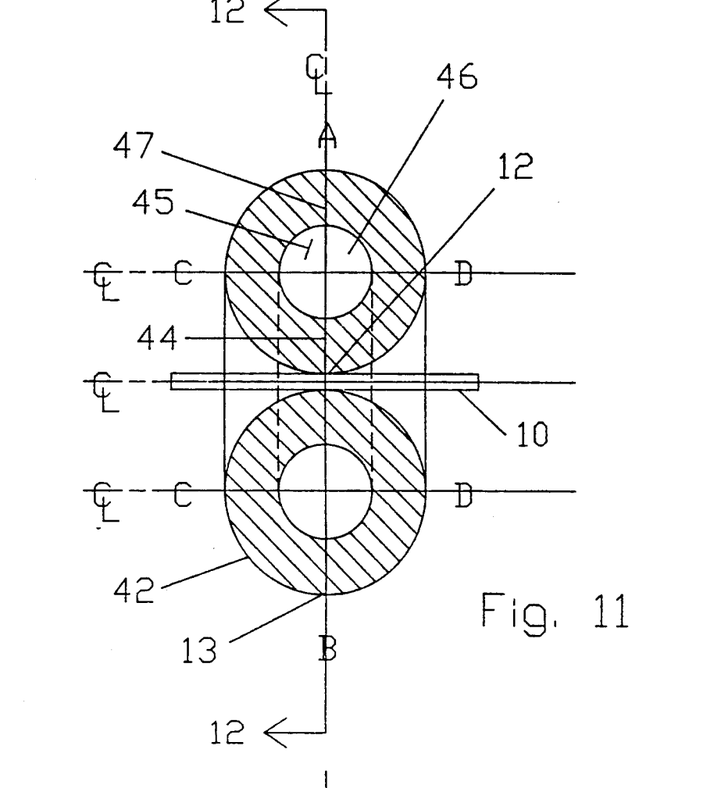
FIG. 11 is a sectional view of a still further embodiment adapted for use with an expandable gas.
Figure 12:
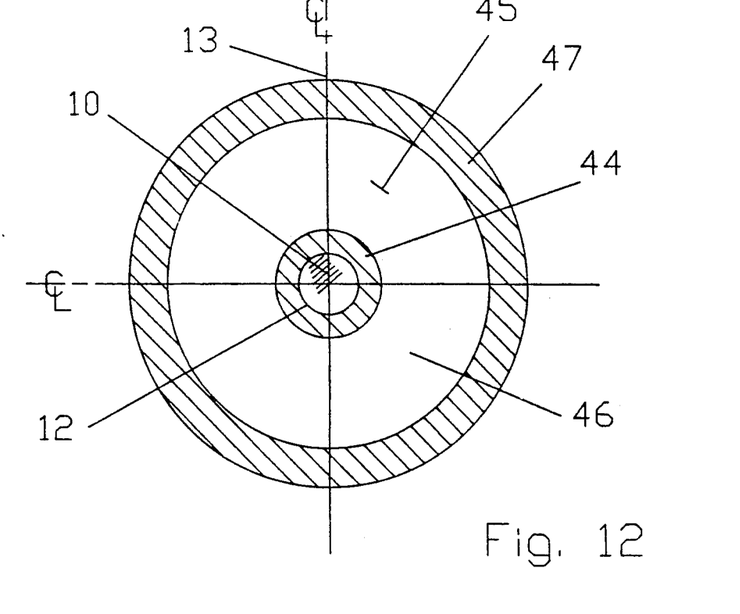
FIG. 12 is a sectional view taken along line 12-12 of FIG. 11.

FIGS. 11 and 12 are sectional views of another O-Ring 42 similar to a tire inner tube which may be mounted in a housing such as the housing 11 of FIG. 10. The structure of O-Ring 42 can be best seen in FIG. 11. O-Ring 42 surrounds shaft 10. Enclosure 46 in O-Ring 42 is filled with a temperature sensitive material such as an expandable gas 45, for example nitrogen. Inner and outer walls or extremities 44 and 47 respectively define the extremes of enclosure 46. As with the expandable compound 50 in FIG. 10, expandable gas 45 is heated and expands during use, providing a pressure seal on shaft 10. Use of nitrogen as the expandable gas has the further advantage of interacting well with typical rubber O-Rings, increasing their resiliency and useful life. The O-Ring of FIGS. 11 and 12 can be manufactured by molding it about a dissolvable tube which defines the enclosed shape 46.

Having described preferred embodiments of the invention with reference to the accompanying drawings, it is to be understood that the invention is not limited to those precise embodiments, and that various changes and modifications may be affected therein by one skilled in the art without departing from the scope or spirit of the invention as defined in the appended claims.

I claim:

1. An elastomeric O-Ring for creating a seal with a shaft comprising:
    an essentially sold elastomeric O-Ring with a circular central opening for receiving a circular shaft that has a center line that it can rotate about or reciprocate along;
    said O-Ring having a minor diameter formed by central opening and a major diameter furthermost from said central opening and a major width thereinbetween;
    a first axis perpendicular to said central opening and essentially bisecting said O-Ring;
    a second axis through a cross-section of said O-Ring perpendicular to said first axis and essentially bisecting said O-Ring cross-section major width;
    an essentially continuous enlarged chamber within said O-Ring predominantly on one side of said first axis;
    a channel extending between said enlarged chamber and the outside of said O-Ring on said one side of said first axis;
    said enlarge chamber and said channel forming a flexible section in said O-Ring on said one side that increases the sealing surface area of said O-Ring in contact with said shaft in response to pressure increase within said enlarged chamber and channel.

2. An elastomeric O-Ring for creating a seal with a shaft as set forth in claim 1 wherein:
    said continuous enlarged chamber is formed so as to be essentially bisected by said second axis.

3. An elastomeric O-Ring for creating a seal with a shaft as set forth in claim 3 wherein:
    said channel has an inner channel wall that extends essentially along said second axis and an outer channel wall that extends essentially on a line 45 degrees from said circular shaft centerline through the intersection point of said first and said second axis into said one side.

4. An elastomeric O-Ring for creating a seal with a shaft as set forth in claim 3 wherein:
    said continuous enlarged chamber is totally on said one side of said first axis and said channel is both totally on said one side of said first axis and on said major diameter side of said second axis.

5. An elastomeric O-Ring for creating a seal with a shaft as set forth in claim 1 wherein:
    said O-Ring is provided with a male section means and a female section means so that it can be connected and disconnected for easy assembly around and disassembly from said shaft.

6. An elastomeric O-Ring for creating a seal with a shaft as set forth in claim 5 wherein:
    said O-Ring male section means and said female section means are formed for assembly and disassembly by sideways movement.

7. An elastomeric O-Ring for creating a seal with a shaft as set forth in claim 5 wherein:
    said O-Ring male section means and said female section means are formed so as to not interrupt said O-Ring continuous enlarged chamber when they are connected.

8. An elastomeric O-Ring for creating a seal with a shaft in combination with a housing comprising:
   an essentially solid elastomeric O-Ring with a circular central opening for receiving a circular shaft therethrough that has a centerline about which it can rotate or along which it can reciprocate;
   said O-Ring having a minor diameter formed by said central opening and a major diameter furthermost from said central opening with a major width thereinbetween;
   a first axis perpendicular to said central opening and essentially bisecting said O-Ring;
   a second axis through a cross-section of said O-Ring perpendicular to said first axis and essentially bisecting said O-Ring cross-section major width and separating said O-Ring into an outer extremity and an inner extremity;
   a housing for said O-Ring having a minor diameter opening forming an inner extremity to accommodate said shaft and an outer external extremity;
   said housing having an internal recess with relatively sharp corners essentially the width of said O-Ring major width and a major diameter, to accommodate said O-Ring major diameter;
   said O-Ring having rounded outer surfaces;
   said O-Ring fitting said housing such that an outer cavity exists between said housing recess major diameter and said O-Ring outer extremity and an inner cavity exists between said O-Ring inner extremity and said shaft;
   said O-Ring major width forming a seal with said housing between said outer cavity and said inner cavity;
   one opening through said housing to said outer cavity and another opening leading to said inner cavity;
   said outer cavity and said inner cavity dimensioned so that said outer cavity has a radial surface area larger than the radical surface area of said inner cavity such that fluid pressure applied into said outer cavity and into said inner cavity sets up opposing forces with the force pressing said O-Ring toward said shaft being greater than that opposing said pressing force and wherein;
   a sealing means is provided for said one opening through said housing so that a pressure fluid within said outer cavity is retained in said outer cavity.

9. An elastomeric O-Ring for creating a seal with a shaft in combination with a housing as in claim 8 wherein:
   said O-Ring is filled with a temperature sensitive material that causes an increase of pressure within said O-Ring with an increase in temperature.

10. An elastomeric O-Ring for creating a seal with a shaft in combination with a housing as in claim 8 wherein:
    said another opening leading to said inner cavity is a clearance between said shaft and said housing inner extremity.

11. An elastomeric O-Ring for creating a seal with a shaft in combination with a housing as in claim 10 wherein:
    said outer cavity extends across said entire internal recess width.

12. An elastomeric O-Ring for creating a seal with a shaft in combination with a housing as in claim 11 wherein:
    said O-Ring outer extremity has a depression that provides radial flexible sections for providing lateral force components in response to a pressure fluid in said outer cavity for pressing said O-Ring flexible sections against said recess side walls.

13. An elastomeric O-Ring for creating a seal with a shaft in combination with a housing comprising:
    an essentially solid elastomeric O-Ring with a circular central opening for receiving a circular shaft therethrough that has a centerline about which it can rotate or along which it can reciprocate;
    said O-Ring having a minor diameter formed by said central opening and a major diameter furthermost from said central opening with a major width thereinbetween;
    a first axis perpendicular to said central opening and essentially bisecting said O-Ring;
    a second axis trough a cross-section of said O-Ring perpendicular to said first axis and essentially bisecting said O-Ring cross-section major width and separating said O-Ring into an outer extremity and an inner extremity;
    a housing for said O-Ring having a minor diameter opening forming an inner extremity; to accommodate said shaft and an outer external extremity;
    said housing having an internal recess with relatively sharp corners essentially the width of said O-Ring major width and a major diameter, to accommodate said O-Ring major diameter;
    said O-Ring having rounded outer surfaces;
    said O-Ring fitting within said housing such that an outer cavity exists between said housing recess major diameter and said O-Ring outer extremity and an inner cavity exists between said O-Ring inner extremity and said shaft;
    said O-Ring major width forming a seal with said housing between said outer cavity and said inner cavity;
    one opening through said housing to said outer cavity and another opening leading to said inner cavity;
    said inner cavity and said inner cavity dimensioned so that said outer cavity has a radial surface area larger than the radial surface area of said inner cavity such that fluid pressure applied into said outer cavity and into said inner cavity sets up opposing forces with the force pressing said O-Ring toward said shaft being greater than that opposing said pressing force;
    said elastomeric O-Ring has an essentially continuous enlarged chamber within said O-Ring predominantly on one side of said first axis with a channel extending between said enlarged chamber and the outside of said O-Ring on said one side of said first axis; and
    said enlarged chamber and said channel forming a flexible section in said O-Ring that increases sealing surface area between said O-Ring and said shaft in response to a pressure increase within said enlarged chamber and said channel.

14. An elastomeric O-Ring for creating a seal with a shaft in combination with a housing as in claim 13 wherein:
    said continuous enlarged chamber is located such that it is essentially bisected by said second axis.

15. An elastomeric O-Ring for creating a seal with a shaft in combination with a housing as in claim 14 wherein:

said channel has an inner channel wall that extends essentially along said second axis and an outer channel wall that extends essentially on a line 45 degrees from said circular shaft centerline through the intersection point of said first and said second axis extending into said one side.

16. An elastomeric O-Ring for creating a seal with a shaft in combination with a housing as in claim 15 wherein:

said continuous enlarged chamber is totally on said one side of said first axis and said channel is totally both on said one side of said first said axis and on said O-Ring outer extremity side of said second axis.

17. An elastomeric O-Ring for creating a seal with a shaft in combination with a housing as in claim 13 wherein:

said O-Ring is provided with a male section means and a female section means so that it can be connected and disconnected for easy assembly around and disassembly from said shaft.

18. An elastomeric O-Ring for creating a seal with a shaft in combination with a housing as in claim 17 wherein:

said O-Ring male section means and said female sections means are formed for assembly and disassembly by sideways movement.

19. An elastomeric O-Ring for creating a seal with a shaft in combination with-a housing as in claim 12 wherein:

said male section means and said female section means are designed so that said O-Ring enlarged chamber is continuous and not interrupted by said male section means or said female section means when connected around said shaft.

20. An elastomeric O-Ring for creating a seal with a shaft in combination with a housing as in claim 8 wherein:

said O-Ring is provided with a hole and said housing is provided with a pin secured thereto that fits within said hole to prevent rotation of said O-Ring within said housing.

21. An elastomeric O-Ring for creating a seal with a shaft in combination with a housing comprising:

a hollow elastomeric O-Ring with a circular central opening for receiving a circular shaft that has a centerline about which it can rotate or reciprocate;

said O-Ring having a minor diameter formed by said central opening and a major diameter furthermost from said central opening and a major width thereinbetween and being filled with a heat expandable material;

a first axis perpendicular to said central opening and essentially bisecting said O-Ring;

a second axis through a cross-section of said O-Ring perpendicular to said first axis and essentially bisecting said O-Ring cross-section into an outer extremity and an inner extremity and essentially passing through said O-Ring major width;

a housing for said O-Ring having a central opening defining a housing minor diameter forming a housing inner extremity, to accommodate said shaft, and having an outer external extremity;

said housing having an internal recess with side walls essentially the width of said O-Ring major width, and a major diameter, to accommodate said O-Ring major diameter;

said O-Ring fitting within said housing such that said O-Ring major diameter contacts said recess major diameter and said O-Ring major width contacts said recess side walls forming seals therewith;

said O-Ring minor diameter, when contacting said shaft, forming a seal therewith and forming an inner cavity between said O-Ring inner extremity and said shaft;

an inner opening leading to said inner cavity for conducting pressure fluid into said inner cavity to form a force in opposition to that created by said heat expandable material within said O-Ring.

* * * * *